United States Patent [19]

Morellini

[11] Patent Number: 4,783,952
[45] Date of Patent: Nov. 15, 1988

[54] HARVESTERS

[76] Inventor: Peter Morellini, P.O. Box 188, Ingham Qld. 4850, Australia

[21] Appl. No.: 131,195

[22] Filed: Dec. 10, 1987

Related U.S. Application Data

[63] Continuation-in-part of Ser. No. 781,871, Sep. 30, 1985, abandoned.

[51] Int. Cl.[4] ............................................. A01D 45/10
[52] U.S. Cl. ..................................... 56/13.9; 56/14.5; 130/27 AE; 198/636
[58] Field of Search ....................... 56/13.9, 14.4, 14.5, 56/16.9, 14.6, 16.5, 16.6, 327 R; 130/27 AE, DIG. 1; 198/633, 636

[56] References Cited

U.S. PATENT DOCUMENTS

| | | | |
|---|---|---|---|
| 115,223 | 5/1871 | Mansfield | 130/DIG. 1 |
| 466,526 | 1/1892 | Kelly | 130/DIG. 1 |
| 2,189,706 | 2/1940 | Clipston | 130/27 AE |
| 2,395,089 | 2/1946 | Arelt | 198/633 |
| 4,196,569 | 4/1980 | Quick | 56/13.9 |
| 4,207,726 | 6/1980 | Lippi | 56/13.9 |

*Primary Examiner*—John Weiss
*Attorney, Agent, or Firm*—Wood, Dalton, Phillips, Mason & Rowe

[57] ABSTRACT

A sugar cane harvester which includes a conveyor for conveying sugar cane billets and a rake assembly suspended above the billet conveyor and including a number of spaced apart prongs which engage billets on the conveyor to strip trash and leaves therefrom and level out the billets on the conveyor.

9 Claims, 4 Drawing Sheets

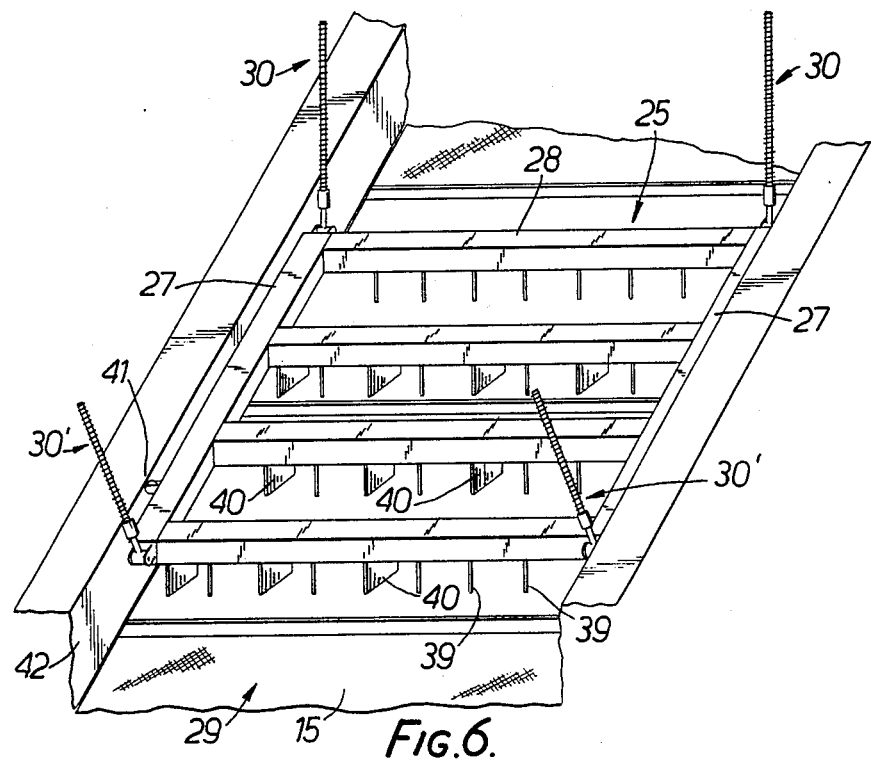

ry elevator to even cane and trash distribution thereon;

HARVESTERS

CROSS REFERENCE TO RELATED APPLICATION

This application is a continuation in part of application Ser. No. 781,871 filed Sept. 30, 1985 abandon 1/26/88 .

BACKGROUND OF THE INVENTION

1. Field of the Invention

This invention relates to improvements to harvesters in particular sugar cane harvesters.

2. Description of the Related Art

Conventional cane harvesters normally include a forwardly extending topper mechanism which is adapted to cut the tops from cane prior to the cane being gathered by the harvester. Cane harvesters also include a base cutter assembly for cutting the cane at its base and a chopper mechanism which cuts the harvested cane into billets and directs the cane billets onto a primary elevator for transport to a secondary elevator so that the cane billets can be deposited in a collection bin or the like. Many machines also incorporate blowers so that trash collected by the harvesters can be blown through a discharge chute at the rear of the machine.

The above known machines suffer a number of disadvantages. Firstly in some harvesters the topper mechanism tends to direct the cut cane tops into the path of the harvester particularly where crosswinds are blowing. This consequently results in the harvester collecting extraneous material and loss of commercial cane sugar. To overcome this disadvantage, some topper mechanisms employ rotating vanes mounted above the topper cutting disc which pelt the cut tops of the cane outwardly to either side of the harvester. Whilst this arrangement usually ensures that the cane tops are not collected by the harvester, a danger is obviously created to people working in the area such as bin haul-out drivers.

A further disadvantage in the known harvesters occurs when sugar cane that has fallen over as a result of wind or heavy rain, or standover cane is to be harvested. In such instances, there is an uneven feed of cane to the chopping mechanism resulting in an uneven deposit of cane on the primary elevator. As a consequence an uneven flow of the chopped-up material has to be handled by the blower which can cause blockages in the trash discharge system. Furthermore, the deposit of billets into the secondary elevator in such circumstances tends to be uneven and often the trash is not clearly stripped from the billets.

U.S. Pat. No. 2,395,089 to Arelt discloses a levelling device for tobacco comprising a series of parallel vanes arranged above a vibrating plate which serves to convey the tobacco. Whilst this type of device is suitable for tobacco type products, it is not suitable for application to cane harvesters where it is necessary to strip leaves from cane billets and where cane billets move along the conveyor in clumps.

SUMMARY OF THE INVENTION

The present invention aims to overcome or alleviate at least some of the above disadvantages of the prior art harvesters. In particular, the present invention provides a levelling and stripper assembly for use in conjunction with the harvester primary or secondary elevator to level out the cane billets thereon and strip trash, leaves and the like from the billets. The invention also provides an improved means for disposal of trash collected by the harvester. Other objects and advantages of the invention will become apparent from the following description.

With the foregoing and other objects in view this invention resides broadly in cane harvester of the type including conveyor means for conveying cane billets wherein the improvement comprises a rake assembly, means for supporting said rake assembly in a substantially fixed operative attitude above said conveyor means, said rake assembly including frame means, a series of prongs fixed to said frame means and extending downwardly towards said conveyor means and terminating at a position spaced therefrom, at least some of said prongs in said series being spaced apart transversely of the direction of movement of said conveyor means and at least some of the prongs in said series being spaced apart longitudinally of the direction of movement of said conveyor means, said prongs being adapted to co-operate with cane billets on said conveyor means to level said billets and strip trash or leaves therefrom.

The rake assembly preferably includes a plurality of spaced apart frame members which carry the prongs and preferably the supporting means for the rake assembly include hanger means for suspending the rake assembly above the conveyor means. Preferably resilient biasing means are associated with the hanger means to urge the rake assembly towards its operative attitude. Suitably the hanger means include at least one elongated hanger member mounted to the harvester for movement in a direction longitudinally of its length.

BRIEF DESCRIPTION OF DRAWINGS

In order that the invention may be more readily understood and put into practical effect, reference will now be made to the accompanying drawings which illustrate preferred embodiments of the invention and wherein:

FIGS. 4, 5 and 6 are respective plan, elevational and perspective views of a levelling and stripper rake assembly for use in conjunction with the primary or secondary elevator to even cane and trash distribution thereon;

DETAILED DESCRIPTION OF THE INVENTION

Figure 1:
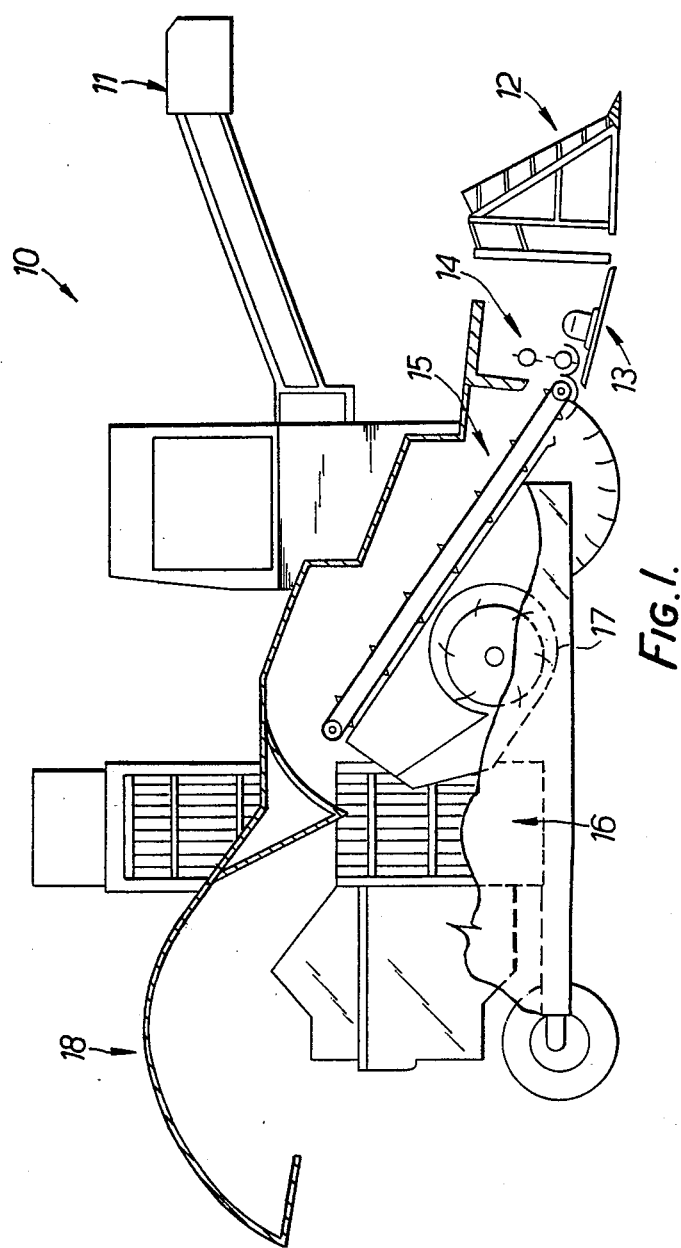
FIG. 1 is a partly cut-away view showing a typical known cane harvester suitable for incorporating the improvements of the present invention.

Referring now to FIG. 1 there is illustrated a typical conventional cane harvester 10 including a forwardly extending topper mechanism 11 for cutting the tops of cane stalks prior to their being fed to the harvesting machine and forward rotary dividers 12 for directing the cane into the base cutters 13 which cut the cane stalks at their base. Co-operative rotary chopper drums 14 are arranged rearwardly of the base cutters 13 and are adapted to chop the cane stalks into billets and deposit the billets onto a primary elevator 15 for raising the billets to a position whereby they may be deposited onto a secondary elevator 16, the secondary elevator 16 being adapted to raise the billets to an elevated height for depositing in a collection bin or the like.

A blower fan 17 arranged between the primary elevator 15 and the secondary elevator 16 is adapted to blow through the cane billets as they fall from the primary elevator 15 and to direct leaves and trash rearwardly of the harvester through a chute 18.

Figure 2:
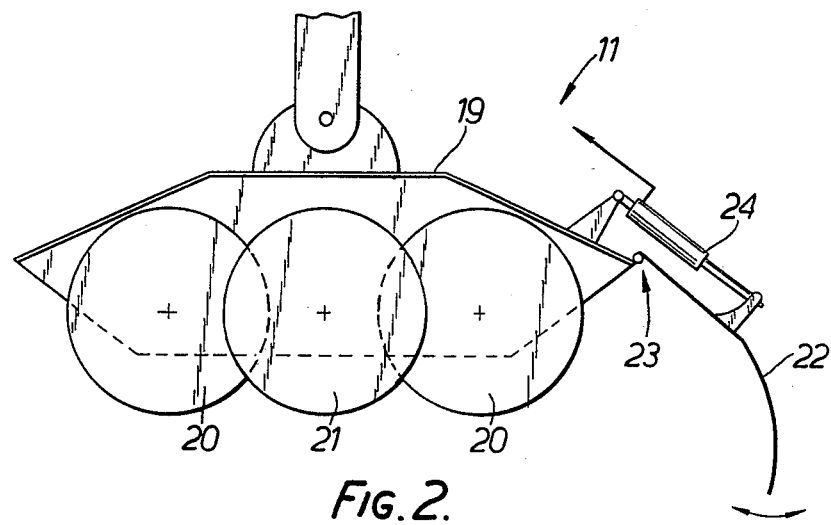
FIGS. 2 and 3 are respective plan and elevational views of the improved topper mechanism for the harvester.
Figure 3:
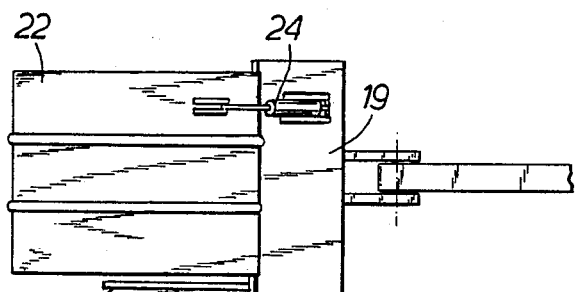

As shown in FIGS. 2 and 3, the topper 11 includes an outer housing 19 in which are mounted a pair of gathering and throwing rotors 20 and a cutting disc 21. The gathering and throwing rotors 20 are adapted to direct the tops of the cane stalks towards the cutting disc 21 which cuts the tops from the stalks and the rotors 20 are then adapted to throw the cut tops outwardly. In accordance with the present invention a hinged deflector door 22 is pivotally connected at 23 to one or both sides of the topper housing 19 for rotation about a substantially vertical axis. Preferably pivotal movement of the hinged door 22 is controlled by a hydraulic ram 24 mounted between the housing 19 and door 22 which is hydraulically linked to a control valve located within the cabin of the harvester.

In use, and when heavy cross winds are encountered, the door 22 can be opened by the operator by actuation of the hydraulic ram 24 so that cane tops which have been cut and thrown outwardly by the rotors 20 strike the door 22 which absorbs much of the energy of the tops so that they drop vertically to the ground away from the mouth of the harvester. This will ensure that the deflected tops do not enter the harvester and thus permit a larger commercial cane sugar yield to be achieved. Furthermore, where a paddock of cane is to be opened up or cane cut near a farm headland, the door 22 can be moved inwardly so that the tops can be directed as close as possible to the harvester. Thus, in the return of the harvester down the next row no tops will be gathered and sent through the harvester. Of course, it will be seen that the angular position of the door 22 can be adjusted so that the tops can be directed where required.

Figure 4:
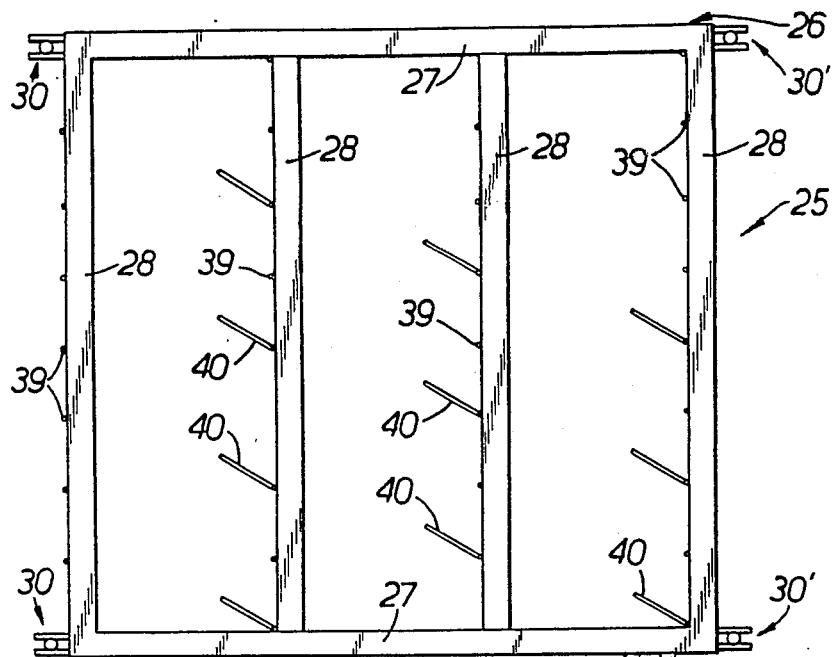
Figure 5:
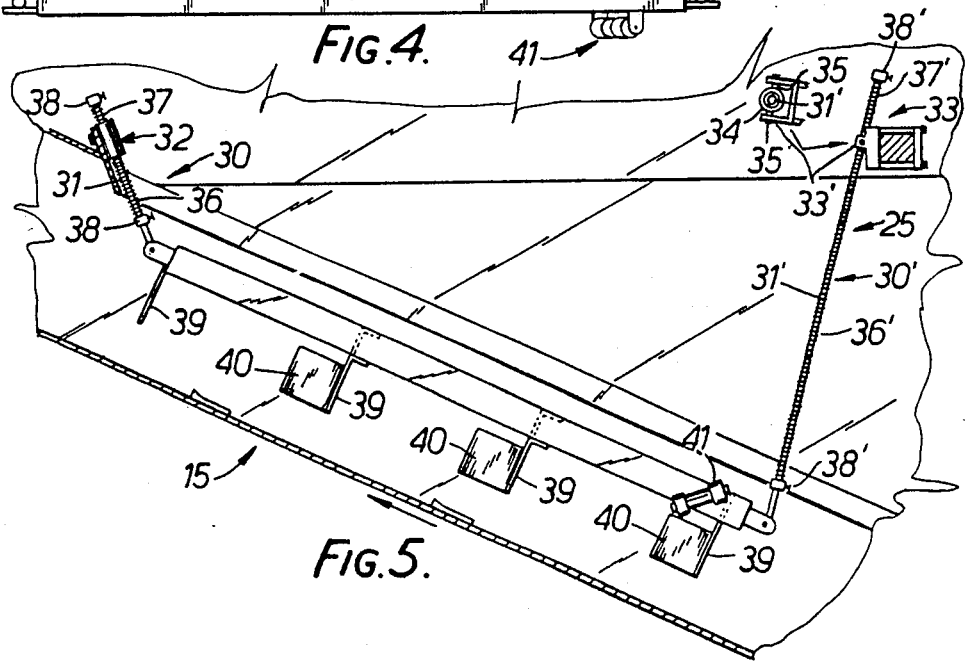

Referring now to FIGS. 4, 5 and 6 there is illustrated a levelling and stripper rake assembly 25 according to the invention for use in conjunction with the primary or secondary elevator 15 or 16 of the harvester. As stated above, in many cases there is an uneven feed of cane along the primary elevator 15 from the chopper drums 14 resulting in an uneven deposit of cane billets onto the secondary elevator 16. In accordance with the present invention, the rake assembly 25 is adapted to be used in conjunction with either elevator to level uneven deposits of cane and strip trash, leaves, etc. therefrom. The rake assembly 25 includes a main rectangular frame assembly 26 having a pair of longitudinally extending side members 27 and a plurality of transverse parallel members 28 extending therebetween. The frame assembly 26 is adapted to be supported in the elevator trough 29 at each corner from the harvester frame by respective forward and rearward pairs of spring loaded hanger assemblies 30 and 30', each of which includes an elongated rod 31 and 31' pivotally connected at their lower ends to the frame assembly 26.

The rods 31 of the forward hanger assemblies 30 pass freely through tubes 32 mounted to the harvester frame whilst the rods 31' of the rearward hanger assemblies 30' are supported by pivotal support assemblies 33 each of which includes a bracket 33' mounted to a transverse member on the harvester frame and an apertured eye member 34 through which a rod 31' freely passes. Each eye member 34 includes a pair of radially extending lugs 35 which serve as trunnions to support the eye member 34 on the bracket for rotational movement about a horizontal axis.

Springs 36 and 37 are disposed about the forward rods 31 on opposite sides of the tube 32 and between the tube 32 and adjustable clamp members 38. Similar springs 36' and 37' are disposed about the rods 31' and between the eye members 34 and further adjustable clamp members 38' on the rods 31'. It will thus be apparent that longitudinal movement of the rods 31 and 31' in opposite directions in the direction of their lengths will be opposed by the respective springs 36, 36', 37 and 37'.

In use where a large clump of cane billets on the elevator 15 is encountered by the rake assembly 25, the frame assembly 26 will tend to move upwardly away from the elevator thus causing upward movement of the rods 31 and 31' against the bias of the springs 36 and 36'. Rods 31' during this movement will also tend to pivot due to their pivotal mounting to the rake assembly frame 26 and support assemblies 33 and any such pivotal movement will cause pivotal movement of the eye members 34. Thus as the eye members 34 pivot with the rods 31', the latter will remain free to move longitudinally through the eye members 34 against the spring bias and will thus not lock up or jam in the eye members 34.

The transverse members 28 of the frame assembly 26 include a plurality of downwardly directed prongs or fingers 39 which coact with the cane billets and trash deposited on the elevator to level same and which are operative to clean the cane by stripping the trash therefrom. Preferably, some of the prongs are provided with rearwardly extending vanes 40 which are angled to the direction of travel of the elevator and act to spread the billets and trash evenly across the elevator.

The frame assembly further includes on one side an inclined roller 41 which cooperates with a side wall 42 of the elevator trough 29 (See FIG. 6). Deflection of the frame assembly 26 will tend to be in the upwards and rearwards direction and the roller 41 will roll along the side wall 42 of the elevator trough to allow for smooth movement of the frame assembly 26 and maintain the frame assembly 26 in spaced relationship therefrom.

When the spring tension in the lower springs 36 and 36' is increased by moving the clamp members 38 and 38' towards the tubes 32 and eye members 34 respectively, a greater spring loading will be applied to the frame assembly 26 so that a greater force is maintained on the cane and trash on the elevator. The upper springs 37 and 37' are adapted to dampen shock loadings caused by rise and fall of the frame assembly 26 and of course the tension in these springs may be varied by the clamp members 38 and 38' to vary the dampening effect on the frame assembly 26.

I claim:

1. A cane harvester of the type including conveyor means for conveying cane billets wherein the improvement comprises a rake assembly, means for supporting said rake assembly in a substantially fixed operative attitude above said conveyor means, said rake assembly including frame means, a series of prongs fixed to said frame means and extending downwardly towards said conveyor means and terminating at a position spaced therefrom, at least some of said prongs in said series being spaced apart transversely of the direction of movement of said conveyor means and at least some of the prongs in said series being spaced apart longitudinally of the direction of movement of said conveyor means, said prongs being adapted to co-operate with cane billets on said conveyor means to level said billets and strip trash or leaves therefrom.

2. A cane harvester according to claim 1 wherein said frame means includes a plurality of spaced apart frame members, said frame members extending transversely of the direction of movement of said conveyor means and wherein said prongs are secured to respective said frame members.

3. A cane harvester according to claim 1 wherein said means for supporting said rake assembly comprises hanger means secured to said harvester and suspending said rake assembly above said conveyor means.

4. A cane harvester according to claim 3 and including resilient biasing means associated with said hanger means and adapted to urge said rake assembly towards said operative attitude.

5. A cane harvester according to claim 4 wherein said hanger means includes at least one elongated hanger member, mounting means for mounting said hanger member to said harvester, said mounting means permitting said hanger member to move in a direction longitudinally of its length, and wherein said resilient biasing means is associated with said hanger member and adapted to resiliently oppose longitudinal movement thereof.

6. A cane harvester according to claim 5 wherein said hanger member includes a pair of stops located on opposite sides of said mounting means and wherein said biasing means includes a pair of springs arranged between the respective said stops and said mounting means such that the respective said springs are compressed upon longitudinal movement of said hanger member in opposite directions.

7. A cane harvester according to claim 6 wherein said rake assembly is supported by a plurality of hanger members, each pivotally connected at their lower ends to said frame means of said rake assembly.

8. A cane harvester according to claim 1 wherein some of said prongs are provided with vanes arranged to direct billets transversly across said conveyor means.

9. A cane harvester according to claim 1 wherein said conveyor means is supported within a trough having a pair of side walls and wherein said rake assembly is located within said trough and provided with roller means for engaging at least one said side wall and spacing said rake assembly therefrom.

* * * * *